Nov. 27, 1951 L. J. HOLZMAN 2,576,459

DRIVE FOR MAGNETIC WIRE RECORDERS

Filed May 14, 1945

INVENTOR.
LAWRENCE J. HOLZMAN
BY
Oberlin & Limbach
ATTORNEYS

Patented Nov. 27, 1951 2,576,459

UNITED STATES PATENT OFFICE 2,576,459

DRIVE FOR MAGNETIC-WIRE RECORDERS

Lawrence J. Holzman, Cleveland, Ohio

Application May 14, 1945, Serial No. 593,655

8 Claims. (Cl. 242—54)

Figures 1, 2, 3, 4:
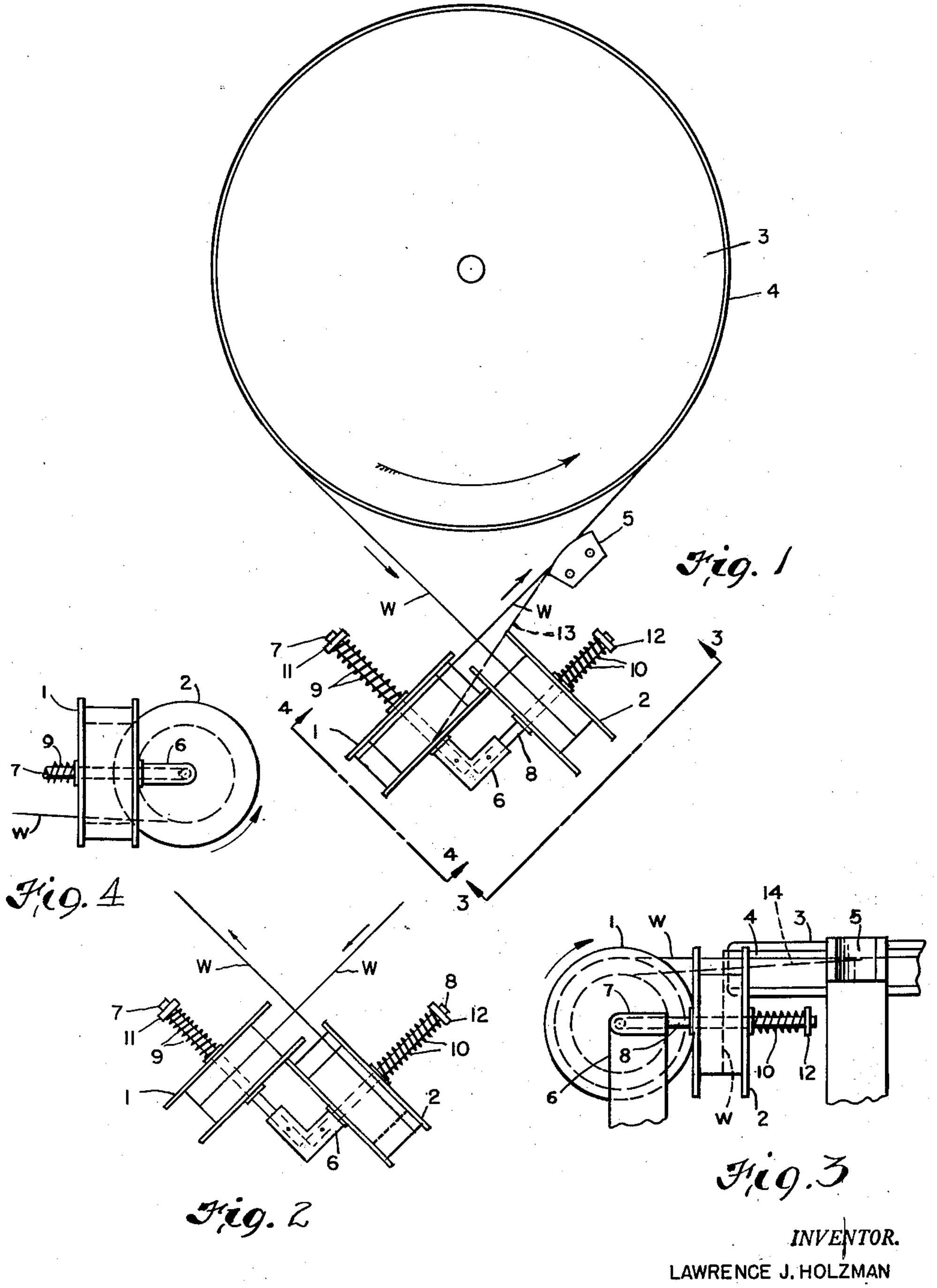

As indicated, the present improvements relate to means for traversing a magnetic-wire or equivalent paramagnetic recording medium through or past either a recording or reproducing head.

As is well known, records of the type in question as a matter of convenience, in fact of necessity, are wound upon rotatable spools, in the course of playing being transferred from one such spool to another. It is of course highly important that the movement of the wire record past the recording or reproducing head should be at a uniform rate. However, since the diameter of the body of wire or equivalent record medium on such spools will of course change, such diameter decreasing as unwound from the one spool and increasing as wound on the other, application of driving means to either such spool has involved the use of rather complicated speed control mechanism and at the best a lack in the desired uniformity in speed of travel of the wire.

One principal object of the present invention is to provide a simple and entirely practical form of drive for a recording medium of the type in question whereby travel of the latter at a uniform rate of speed will be insured. A further object is to permit regulation of such rate to be readily effected. A further object is to provide a form of drive which may be readily incorporated in existing mechanical sound reproducing machines of the disc record type.

To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a plan view, more or less diagrammatic in character, illustrating one form of my present improved drive for a magnetic wire or equivalent paramagnetic recording medium;

Fig. 2 illustrates a portion of such mechanism as rearranged for operation in the reverse direction; and Figs. 3 and 4 are elevation views as viewed along the lines 3—3 and 4—4, Fig. 1 respectively.

As usual, the magnetic wire W is carried on spools, being shown in Fig. 1 as being unwound from a spool 1 and wound onto a spool 2. In passing from the one spool to the other the wire is carried around a rotatable disc 3 of relatively large diameter, the spools being so located in relation thereto that the wire will contact with the major portion of the periphery of such disc. The latter will desirably be provided with a rubber rim 4 wherewith the wire will engage with sufficient friction so that upon rotation of the disc it may be drawn from spool 1 under such degree of tension as is desired.

In passing from such spool to the disc the wire will pass through a recording or reproducing head 5 of conventional construction, whereby either the wire is magnetized to produce the magnetic record therein or the wire previously magnetized will cause the record to be reproduced through the medium of the usual amplifier and electronic circuits. It will be understood that the head 5 may be constructed so as to serve the dual purpose of recording and reproducing.

Disc 3, which as stated constitutes the driving means proper, will be driven either by an electric or a spring motor just as is the turntable in a conventional mechanical sound reproducing machine of the disc type, i. e. of the type in which the record consists of a groove formed in the surface of the disc and adapted to engage a needle in a reproducing head. Such drive will include the usual governor whereby the speed of rotation of the turntable may be regulated with any desired degree of exactness. It has been deemed unnecessary for the purpose in hand to illustrate the detailed construction of such drive, either of the motor or such speed governing means.

A special mounting is provided for the spools 1 and 2 whereby the latter are held in adjacent relation with their axes disposed at right angles. The spools will be thus supported in relation to the driving disc of turntable 3 so that the wire in passing from the one to the other will cross at approximately right angles and lie substantially tangential to the periphery of the disc. The mounting for the spools, as illustrated, comprises a supporting member 6 which carries rectangularly related spindles 7 and 8 upon which the respective spools 1 and 2 may be rotatably mounted. The length of said spindles is substantially greater than the width of said spools so that their ends will project beyond the latter, and compression springs 9 and 10 are interposed between the outer faces of the respective spools and stops 11 and 12 on such respective spindle ends. These stops will be threaded or otherwise adjustably secured on the spindle ends so that the pressure of the corresponding springs against the spools may be adjusted as found desirable.

As will be noted upon comparing the positions shown in Figs. 1 and 2 respectively, when thus mounted on the spindles 7 and 8 one spool will have peripheral engagement with the adjacent lateral face of the other. In the first case spool 1 thus engages spool 2, while in the second case spool 2 thus engages spool 1. In the first case spool 1, due to the fact that the wire is being drawn therefrom, constitutes a driver with respect to spool 2. However, as its driving diameter is larger than that of the second spool, the latter would normally rotate more rapidly than the former, the difference being taken up in slippage between the two spools at the point of contact therebetween. Accordingly it will be seen that by properly tensioning spring 10 the latter may be caused to impose on wire W at any desired degree of tension. Such tension ordinarily need not be great, e. g. about 5 oz. will suffice where using a magnetic wire record of the usual gauge.

When it is desired to rewind the wire, the direction of rotation of the turntable is reversed and also the relative position of the spools. In other words, as illustrated in Fig. 2, spool 2 becomes the driver and spool 1 the driven element, spring 9 being adjusted just as spring 10 so as to impose the desired degree of tension on the wire W.

In Figs. 1, 3 and 4 the supply spool 1 is shown with a full coil of wire W wound therearound and with said wire drawn by disc 3 tangentially from said spool 1 past the head 5 and the take-up spool 2 is shown substantially empty with the wire W passing from said disc beneath said spool 2 and attached to the hub thereof. Upon rotation of disc 3 counterclockwise as shown in Fig. 1, the wire W as it is unwound from spool 1 will travel back and forth axially between the flanges of spool 1, the extremities of such travel being indicated by the solid line of wire W and the dash line 13. At the same time, the coil of wire on spool 1 will become progressively smaller in diameter whereby when the inner end of the wire is reached it will be unwound from spool 1 as indicated by the dash line 14 in Fig. 3.

Because the flanges of spools 1 and 2 are circular and of the same diameter and because the line of intersection of the planes of the driving and driven flanges of said spools is a chord of length substantially equal to or less than the diameter of the hub of the driving spool as best shown in Fig. 4 and because the wire W when drawn off from the portion of the coil adjacent the driving flange of spool 1 is at an angle relative to the axis of spindle 8 as indicated by the dash line 13 in Fig. 1; there is provided an adequate clearance at all times between the wire W and the flanges of spool 2 whereby to avoid the possibility of abrading or otherwise injuring the wire.

From the foregoing description it will be seen that I have provided a very simple and at the same time effective drive mechanism for magnetic wire records which is wholly unaffected by changes in the diameter of the body of wire as it is wound upon or unwound from the spools. At the same time the tension imposed on the wire can be nicely regulated so as to insure as nearly perfect recording or reproducing as possible. Furthermore, since as previously indicated the rotatable disc 3 which constitutes the main driving element, in construction and operation is identical with the turntable in conventional mechanical sound reproducing machines, the latter may be easily and inexpensively converted for use in magnetic wire recording and reproducing by simply providing such a machine with the spool mounting as described and of course the necessary recording and/or reproducing head. In addition the periphery of the disc will be fitted with a rubber rim or similar element adapted to retain and engage the wire or corresponding paramagnetic recording medium as it is drawn from the one spool and wound up on the other.

It will be understood that the drive just described may be advantageously employed for the purpose of moving the wire in one direction only instead of reversibly. In that event of course it will be unnecessary to provide for reversing the relation of the two spools; in other words, the supply spool will not require to be axially shiftable on its spindle nor will any resilient means require to be associated therewith to press the same laterally against a peripheral portion of the other spool. It will also be understood that my improved drive mechanism for a magnetic-wire recorder may be utilized to pass the wire through a so-called erasing coil instead of through a recording and/or reproducing head. Finally, the term "wire" as used herein will be understood to connote any equivalent form of longitudinally extended flexible paramagnetic recording medium.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In magnetic wire recorders and the like, the combination of a winding spool, an unwinding spool, rectangularly related spindles whereon said spools are respectively rotatably mounted, said winding spool being also axially shiftable on its spindle, resilient means associated with said last-named spindle whereby the spool thereon is laterally pressed against a peripheral portion of the other spool, and a rotatable power driven member wherewith the wire engages in passing from said unwinding to said winding spool.

2. In magnetic wire recorders and the like, the combination of a winding spool, an unwinding spool, rectangularly related spindles whereon said spools are respectively rotatably mounted, said winding spool being also axially shiftable on its spindle, resilient means associated with said last-named spindle whereby the spool thereon is laterally pressed against a peripheral portion of the other spool, and a rotatable power driven member wherewith the wire engages in passing from said unwinding to said winding spool, said spools being so located in relation to said driven member that the wire in passing therefrom will contact with the major portion of the periphery of said member.

3. In magnetic wire recorders and the like, the combination of a winding spool, an unwinding spool, rectangularly related spindles whereon said spools are respectively rotatably mounted, said winding spool being also axially shiftable on its spindle, a compression spring interposed between the outer end of the latter and said unwinding spool so as to resiliently press the same laterally against a peripheral portion of the other spool, and a rotatable power driven member wherewith the wire engages in passing from said unwinding to said winding spool.

4. In magnetic wire recorders and the like, the combination of two spools adapted interchangeably to serve the one as a winding and the other as an unwinding spool, rectangularly related spindles whereon said spools are respectively rotatably mounted and axially shiftable, resilient means associated with said spindles whereby either spool may be laterally pressed against a peripheral portion of the other spool, and a rotatable power driven member wherewith the wire engages in passing from said unwinding to said winding spool.

5. In magnetic wire recorders and the like, the combination of flanged winding and unwinding spools, means supporting said spools for rotation about angularly related axes with the peripheral edge of one flange of said unwinding spool in slip-friction driving engagement with the side of one flange of said winding spool, and means for driving said unwinding spool to unwind wire therefrom and thereby driving said winding spool through such slip-friction driving engagement of said spools as aforesaid to wind the wire onto the latter.

6. In magnetic wire recorders and the like, the combination of flanged winding and unwinding spools, means supporting said spools for rotation about angularly related axes with the peripheral edge of one flange of said unwinding spool in slip-friction driving engagement with the side of one flange of said winding spool on a radius less than the radius of such one flange, and means for driving said unwinding spool to unwind wire therefrom and thereby driving said winding spool through such slip-friction driving engagement of said spools as aforesaid to wind the wire onto the latter.

7. In magnetic wire recorders and the like, the combination of flanged winding and unwinding spools, means supporting said spools for rotation about angularly related axes with the peripheral edge of one flange of said unwinding spool in slip-friction driving engagement with the side of one flange of said winding spool on a radius less than the radius of such one flange tending to drive the latter at a speed greater than its own, and means for driving said unwinding spool to unwind wire therefrom and thereby driving said winding spool through such slip-friction driving engagement of said spools as aforesaid to wind the wire onto the latter.

8. In magnetic wire recorders and the like, the combination of a winding spool, an unwinding spool, angularly related spindles whereon said spools are respectively rotatably mounted, said winding spool being also axially shiftable on its spindle, resilient means associated with said last-named spindle whereby the spool thereon is laterally pressed against a peripheral portion of the other spool, and means for driving said unwinding spool to unwind wire therefrom and thereby driving said winding spool through the engagement of said spools as aforesaid to wind the wire onto said winding spool.

LAWRENCE J. HOLZMAN.

REFERENCES CITED

The following references are of record in the file of this patent:

UNITED STATES PATENTS

| Number | Name | Date |
|---|---|---|
| 1,414,941 | Gill | May 2, 1922 |
| 1,718,355 | Hutchinson | June 25, 1929 |
| 1,981,370 | Mowat | Nov. 20, 1934 |
| 2,096,805 | Hickman | Oct. 26, 1937 |
| 2,477,146 | Scherbatskoy | July 26, 1949 |

FOREIGN PATENTS

| Number | Country | Date |
|---|---|---|
| 206,226 | Switzerland | Oct. 16, 1939 |
| 363,549 | Great Britain | Dec. 24, 1931 |
| 551,550 | Germany | June 2, 1932 |